J. F. SAYER.
Wheel Harrows.

No. 153,785.

Patented Aug. 4, 1874.

WITNESSES:
E. Wolff
C. Sedgwick

INVENTOR:
J. F. Sayer
BY
ATTORNEYS.

UNITED STATES PATENT OFFICE.

JAMES F. SAYER, OF MACOMB, NEW YORK.

IMPROVEMENT IN WHEEL-HARROWS.

Specification forming part of Letters Patent No. 153,785, dated August 4, 1874; application filed May 29, 1874.

*To all whom it may concern:*

Be it known that I, JAMES F. SAYER, of Macomb, in the county of St. Lawrence and State of New York, have invented a new and Improved Harrow, of which the following is a specification:

This invention will first be fully described, and then pointed out in the claims.

Figure 1:
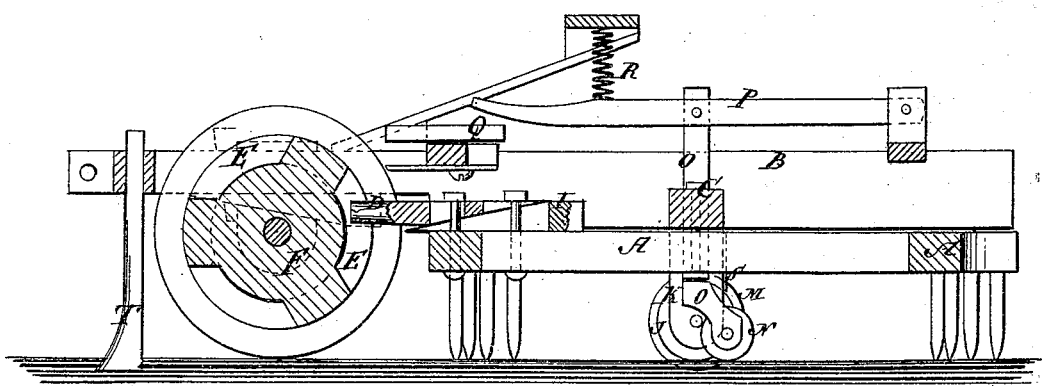
Figure 2:
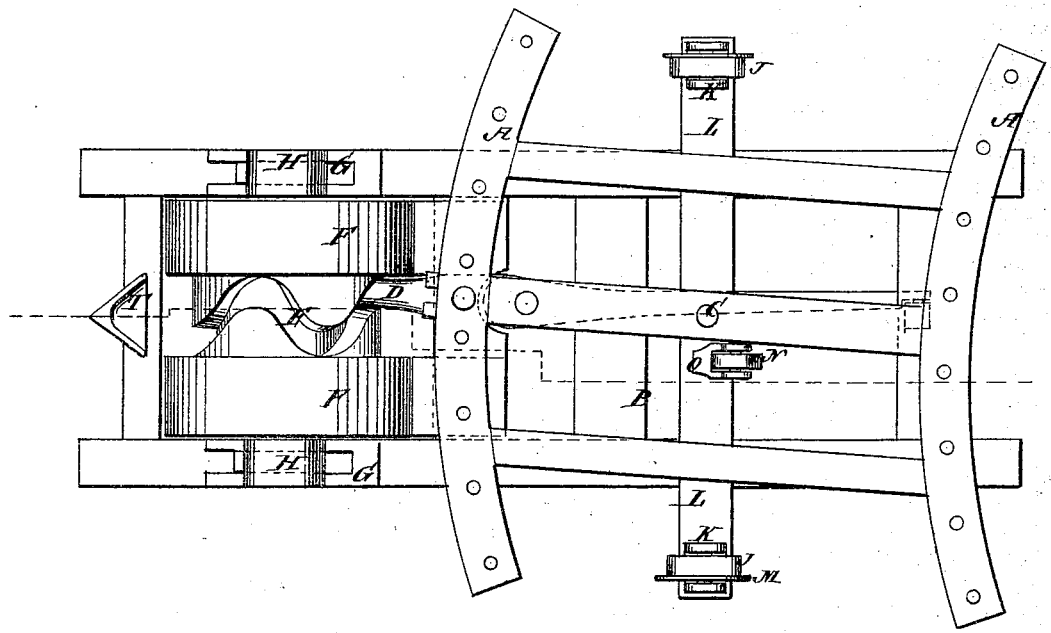

Figure 1 is a longitudinal sectional elevation of my improved harrow; and Fig. 2 is a plan of the bottom of it.

Similar letters of reference indicate corresponding parts.

A represents the harrow, which is suspended from the truck-frame B, at its center, by a vertical pivot, C, so that the harrow may vibrate, and at the front end the harrow has a tongue, D, projecting into the zigzag cam-groove E of a large roller, F, at the front end of the truck, to be vibrated by said roller, which is to be turned by traction, and will, in practice, be large and long, to present ample surface to the ground, to obtain the necessary traction.

The roller is adjustable vertically by slotted wedges G, in connection with the tenoned standard H, in which the axle-bearings of the roller are fixed, to regulate the height of the truck-frame from the ground.

The tongue D is also adjustable, as to height, to correspond with the cam-wheel, by the slotted wedge I, and it is fastened by bolts in slotted holes, to allow it to be shoved back out of the cam-groove, when it is not desired to have the harrow vibrated by the cam.

The hinder wheels J of the truck are vertically adjustable by shifting their standard K up and down in the beam L, and fastening them with a set-screw; and they have a flange, M, to run into the ground, to prevent the harrow from shifting the truck-frame about.

N is a caster-wheel on a long standard, O, in the middle of the rear part of the frame, working up and down in it, and having a foot-lever, P, connected to it, and also connected to the truck-frame, so that the driver can lift the harrow off of the ground by pressing said lever down with his foot while sitting upon the seat. Q is a button for fastening said lever down to hold the harrow up for passing along the road or from one field to another.

The lever P is connected to the seat by a spring, R, to hold it up when the harrow is to be allowed to work. The wheels J have a scraper, S, to scrape off the earth which tends to pack in the angle between the face of the wheel and the flange. T is a guard suspended from the frame in advance of the groove of the roller, to throw off any stones, clods, and other matters that might fill or choke it up. V represents adjustable scrapers for clearing the roller.

Having thus described my invention, I claim as new and desire to secure by Letters Patent—

1. The tongue D of the vibrating harrow, arranged to be adjusted vertically relatively to the vertically-adjustable wheel F, substantially as specified.

2. The tongue D, connected to the vibrating harrow, to shift out of the cam-groove, substantially as specified.

JAMES F. SAYER.

Witnesses:
FORTUNATUS SAYER,
JOHN STACEY.